United States Patent
Jalluri et al.

(10) Patent No.: US 10,739,754 B2
(45) Date of Patent: Aug. 11, 2020

(54) METHOD AND SYSTEM FOR MONITORING MACHINE HEALTH TO IMPROVE MACHINE CYCLE TIME IMPACT

(71) Applicant: Ford Motor Company, Dearborn, MI (US)

(72) Inventors: Chandra Jalluri, Canton, MI (US); Himanshu Rajoria, Canton, MI (US); David Paul Low, Amhertsburg (CA); Annette Januszczak, Dearborn, MI (US); Paul Frederick Krotke, Canton, MI (US); Stephen John Hermiller, New Baltimore, MI (US)

(73) Assignee: Ford Motor Company, Dearborn, MI (US)

( * ) Notice: Subject to any disclaimer, the term of this patent is extended or adjusted under 35 U.S.C. 154(b) by 144 days.

(21) Appl. No.: 15/977,072

(22) Filed: May 11, 2018

(65) Prior Publication Data

US 2019/0346822 A1 Nov. 14, 2019

(51) Int. Cl.
   *G05B 19/4065* (2006.01)
   *G01M 99/00* (2011.01)

(52) U.S. Cl.
   CPC ....... *G05B 19/4065* (2013.01); *G01M 99/005* (2013.01); *G05B 2219/33325* (2013.01)

(58) Field of Classification Search
   CPC .................. G05B 19/4065; G01M 99/005
   See application file for complete search history.

(56) References Cited

U.S. PATENT DOCUMENTS

| 5,407,265 | A | 4/1995 | Hamidieh et al. | |
|---|---|---|---|---|
| 6,161,055 | A | 12/2000 | Pryor | |
| 6,289,735 | B1 * | 9/2001 | Dister | G01H 1/003 73/579 |
| 7,571,022 | B2 | 8/2009 | Jalluri et al. | |
| 2003/0105775 | A1 * | 6/2003 | Shimada | G06Q 10/06 |
| 2004/0193467 | A1 * | 9/2004 | Williams | G06Q 10/04 705/7.24 |

(Continued)

FOREIGN PATENT DOCUMENTS

DE   102015201498   8/2016

OTHER PUBLICATIONS

How It Works—Tool Monitoring, Keeping Tabs on Your Tools, Today's Machining World Archive: Mar. 2007, vol. 3 (03), available at URL http://todaysmachiningworld.com/magazine/how-it-works-tool-monitoring/.

*Primary Examiner* — Vincent H Tran
(74) *Attorney, Agent, or Firm* — Burris Law, PLLC

(57) ABSTRACT

The present disclosure is directed toward a method for monitoring health of a machining tool operable in a machining state to form a workpiece and a non-machining state. The method includes determining whether a machine health routine is to be performed based on a machine health record stored by the control system, and retrieving a non-machining cyclic schedule, in response to the machine health routine having to be performed, where the non-machining cyclic schedule defines a timetable for performing one or more maintenance routines. The method further includes identifying a primary maintenance routine from among the one or more maintenance routines based on the non-machining cyclic schedule, and scheduling the machine health routine with the primary maintenance routine.

17 Claims, 8 Drawing Sheets

(56) References Cited

U.S. PATENT DOCUMENTS

| | | | |
|---|---|---|---|
| 2006/0089744 | A1 | 4/2006 | Jalluri et al. |
| 2010/0312371 | A1* | 12/2010 | Suginishi ......... G05B 19/41865 |
| | | | 700/101 |
| 2011/0137697 | A1* | 6/2011 | Yedatore ............ G05B 23/0283 |
| | | | 705/7.13 |
| 2011/0202187 | A1* | 8/2011 | Bowmer ............ G05B 23/0283 |
| | | | 700/283 |
| 2013/0253670 | A1 | 9/2013 | Chung et al. |
| 2016/0214115 | A1* | 7/2016 | Bauer .................... B02C 25/00 |
| 2016/0314439 | A1* | 10/2016 | Pinkerton ............. G06Q 10/20 |
| 2016/0370259 | A1 | 12/2016 | Loverich et al. |
| 2017/0131710 | A1 | 5/2017 | Chen et al. |
| 2017/0236075 | A1* | 8/2017 | Shi .......................... G06T 7/001 |
| | | | 701/31.4 |
| 2017/0356283 | A1* | 12/2017 | Al-Gouhi ................. E21B 47/00 |
| 2018/0316729 | A1* | 11/2018 | Chauvet ............. G06F 9/45558 |
| 2018/0372016 | A1* | 12/2018 | Calhoun ................... F02C 9/00 |
| 2019/0102240 | A1* | 4/2019 | Zarrini ................. G06F 11/079 |

\* cited by examiner

| Code | Maintenance Routines | Inclusive/ Independent |
|---|---|---|
| MR1 | Gage Bore Probe | Independent |
| MR2 | Clean Part | Independent |
| MR3 | Clean Fixture | Independent |
| MR4 | Minimum Quantity Lubrication Priming | Independent |
| MR5 | Warm Up | Inclusive |
| MR6 | Keep Warm | Inclusive |
| MR7 | Tool Break Check (within every cycle | Independent |
| MR8 | Tool Pocket Lubrication Cycle | Independent |
| MR9 | Exhaust Clean Cycle | Inclusive |
| MR10 | Safety Integrated Brake Test | Independent |
| MR11 | CNC Lubrication Cycle | Inclusive |

FIG. 4

| M.R. | Non-Machine Cyclic Schedule | | |
|---|---|---|---|
| | Start-Time | End-Time | Duration |
| MR1 | 2017-12-22 09:25:00 | 2017-12-22 09:28:00 | 3 |
| MR1 | 2017-12-25 12:00:00 | 2017-12-25 12:05:00 | 5 |
| MR2 | 2017-12-25 14:15:00 | 2017-12-25 14:17:00 | 2 |
| MR3 | 2017-12-25 20:42:00 | -- | |
| MR1 | 2017-12-28 09:25:00 | -- | |
| MR4 | 2017-12-29 07:00:00 | -- | |

FIG. 5A

| | Non-Machine Cyclic Schedule | | |
|---|---|---|---|
| M.R. | Start-Time | End-Time | Duration |
| MR1 | 2017-12-22 09:25:00 | 2017-12-22 09:28:00 | 3 min |
| MR1 | 2017-12-25 12:00:00 | 2017-12-25 12:05:00 | 5 min |
| MR2 | 2017-12-25 14:15:00 | 2017-12-25 14:17:00 | 2 min |
| MR3 | 2017-12-25 20:42:00 | -- | |
| MR1 | 2017-12-28 09:25:00 | -- | |
| MHR | 2017-12-28 09:25:00 | | |
| MR4 | 2017-12-29 07:00:00 | -- | |

FIG. 5B

METHOD AND SYSTEM FOR MONITORING MACHINE HEALTH TO IMPROVE MACHINE CYCLE TIME IMPACT

FIELD

The present invention relates to a system for monitoring machine health of a computer numerical control (CNC) machining tool.

BACKGROUND

The statements in this section merely provide background information related to the present disclosure and may not constitute prior art.

In large-scale production environments, dozens of computer numerical control (CNC) machining tools are configured to execute preprogrammed sequence of commands to automate various machining operations. In addition to machining, machining tools undergo various preventive maintenance routines, such as scheduled tool changes, cleanings, and warm-ups, to improve the quality of the parts and inhibit machine failures causing the machining tool to be offline. During these maintenance operations, the machining tool is placed in a non-machining state in which the production line having the machining tool is temporarily paused as the machining tool undergoes a scheduled maintenance routine.

To better understand the performance of the machining tool and improve the scheduling of the maintenance routines, manufacturers collect data on the performance of the machining tool and its components. This data can form a historical trend to assess the health of the machining tool, identify potential issues, and define the maintenance routines to be periodically performed on the machining tool. But the collection of this data is generally conducted in an operation that places the machining tool in a non-machining state, and thus can be regarded as too costly in large scale productions. These and other issues are addressed by the teachings of the present disclosure.

SUMMARY

This section provides a general summary of the disclosure, and is not a comprehensive disclosure of its full scope or all of its features.

In one form, the present disclosure is directed toward a method for monitoring health of a machining tool operable in a machining state to form a workpiece and a non-machining state. The method includes: determining, by a control system, whether a machine health routine is to be performed based on a machine health record stored by the control system; retrieving, by the control system, a non-machining cyclic schedule, in response to the machine health routine having to be performed; identifying, by the control system, a primary maintenance routine from among the one or more maintenance routines based on the non-machining cyclic schedule; and scheduling and performing, by the control system, the machine health routine with the primary maintenance routine. The non-machining cyclic schedule defines a timetable for performing one or more maintenance routines In another form, the method further includes: determining, by the control system, whether the primary maintenance routine is an inclusive routine or an independent routine; performing, by the control system, the machine health routine concurrently with the primary maintenance routine in response to the primary maintenance routine being inclusive; and performing, by the control system, the machine health routine consecutively with the primary maintenance routine in response to the primary maintenance routine being independent.

In yet another form, the method further includes performing, by the control system, a predetermined component analysis health routine, as part of the machine health routine to obtain data indicative of a vibration response of the machining tool in response to the primary maintenance routine being independent.

In one form, the method further includes: acquiring, from a sensor, data indicative of the vibration response of the machining tool as part of the machine health routine as the primary maintenance routine is being performed; and analyzing, by the control system, the data acquired to output a health trend of the machining tool as part of the machine health routine.

In another form, the machine health record defines parameters for determining performance of the machine health routine and includes data indicative of an operation history of the maintenance health routine.

In yet another form, the method further includes determining and storing, by the control system, a subsequent test time for performing the maintenance health routine based on the parameters and the operation history defined by the machine health record. The determining whether the machine health routine is to be performed further includes comparing the subsequent test time provided in the machine health record with an internal clock of the control system, and determining the machine health record is to be performed in response to the subsequent test time being within a predefined time period.

In one form, the primary maintenance routine is performed at a specific timeslot defined by the non-machining cyclic schedule and is proximal to the subsequent test time of the machine health routine.

In another form, the parameters include at least one of a test frequency of the machine health routine, and an operation period of the test frequency level.

In yet another form, the method further includes: placing, by the control system, the machining tool in the non-machining state from the machining state when the primary maintenance routine is to be performed; performing, by the control system, the primary maintenance routine and the machine health routine; and storing, by the control system, data indicative of a date and time that the maintenance health routine was performed as part of the machine health record.

In one form, the method further includes: setting a test frequency for the machine health routine to a first frequency for a first operation period; setting the test frequency for the machine health routine to a second frequency having a greater duration than that of the first frequency in response to the lapse of the first operation period; and setting the test frequency for the machine health routine to the first frequency in response to the machining tool experiencing an abnormal operation.

In another form, the first operation period is based on a cycle run life of a component of the machining tool.

In yet another form, the first operation period is a predefined time period.

In one form, the present disclosure is directed toward a machining tool including a machine and a control system. The machine is operable in a machining state to machine a workpiece and in a non-machining state to perform a maintenance routine from among a plurality of maintenance routines. The control system is configured to control the machine in the machining state and the non-machining state. The control system is configured to execute a machine health routine in conjunction with a primary maintenance routine selected from among the plurality of maintenance routines based on a non-machining cyclic schedule that defines dates and times for performing the maintenance routines and a machine health record that includes information indicative of a subsequent test time for performing the machine health routine.

In another form, the control system is configured to execute the machine health routine concurrently with the primary maintenance routine in response to the primary maintenance routine being defined as an inclusive routine, and configured to execute the machine health routine consecutively with the primary maintenance routine in response to the primary maintenance routine being defined as an independent routine.

In yet another form, the control system is configured to set a test frequency for performing the machine health routine. The control system sets the test frequency to a first frequency for a first operation period, to a second frequency longer than that of the first frequency in response to the lapse of the first operation period; and to the first frequency in response to an abnormal operation of the machine.

In one form, the primary maintenance is a maintenance routine that is to be performed at a specific timeslot defined by the non-machining cyclic schedule and is proximal to the subsequent test time of the machine health routine.

In one form, the present disclosure is directed toward, a machining tool control method that includes: determining a performance time for executing a vibration analysis on a machining tool based on a test frequency for the analysis; retrieving a non-machining schedule that defines a timetable for executing multiple maintenance routines on the machining tool; selecting, from among the maintenance routines, a primary routine that is performed at a time period proximal to the performance time; and executing the vibration analysis with the primary routine.

In another form, the machining tool control method further includes: setting the test frequency of the vibration analysis to a first frequency for a first operation period; setting the test frequency to a second frequency having a greater duration than that of the first frequency in response to the lapse of the first operation period; and setting the test frequency to the first frequency in response to the machining tool experiencing an abnormal operation.

In yet another form, the machining tool control method further includes: determining whether the primary routine is an inclusive routine or an independent routine; performing the vibration analysis concurrently with the primary routine in response to the primary routine being inclusive; and performing the vibration analysis consecutively with the primary routine in response to the primary routine being independent.

In one form, the machining tool control method further includes: transferring the machining tool to a non-machining state from a machining state when the primary routine is to be performed; performing the primary routine and the vibration analysis; and storing data indicative of a date and time that the vibration analysis was performed as part of a machine health record, wherein the determining the performance time is based on the date and time a previous vibration analysis was performed and the test frequency.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 6:
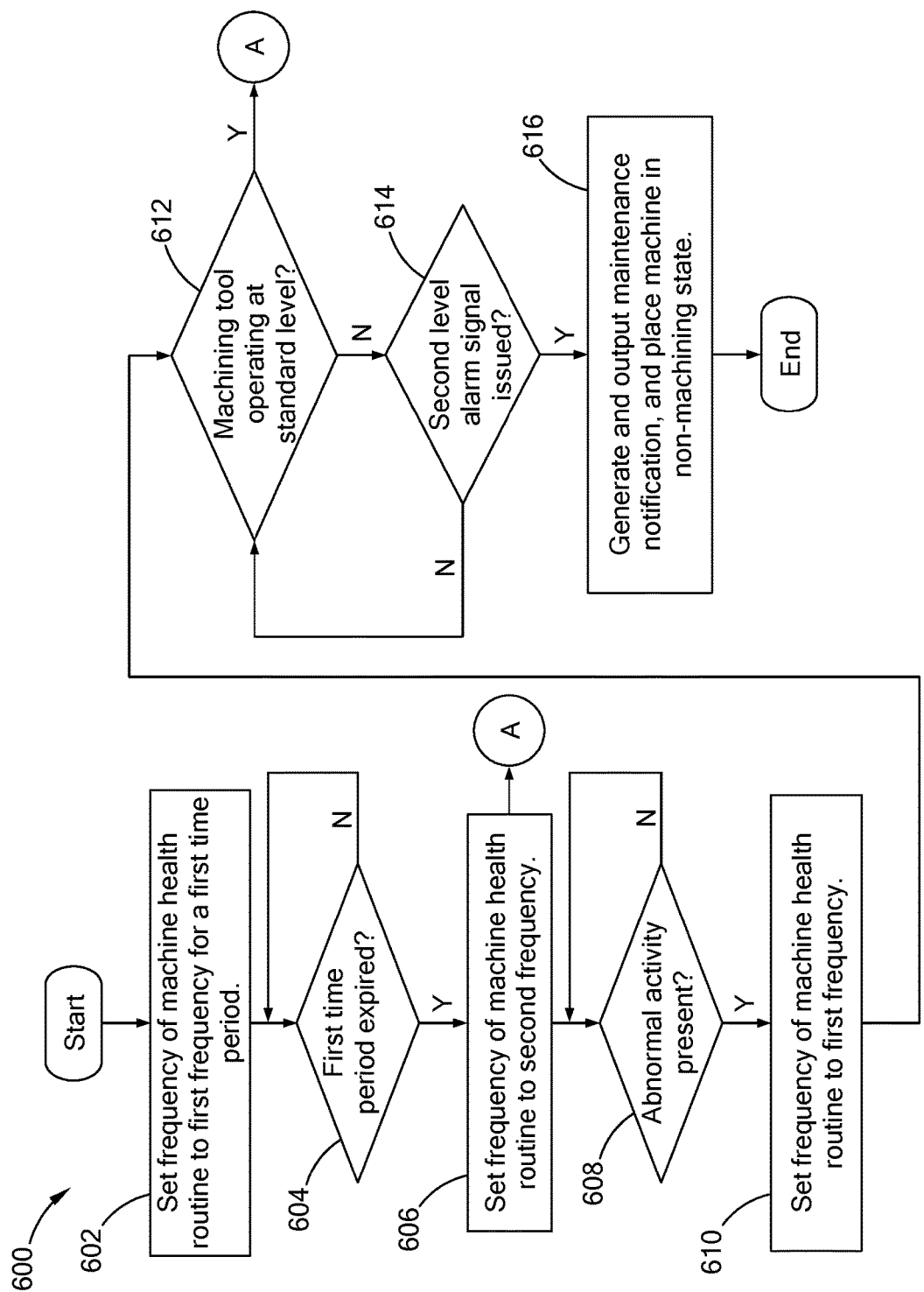
Figure 7:
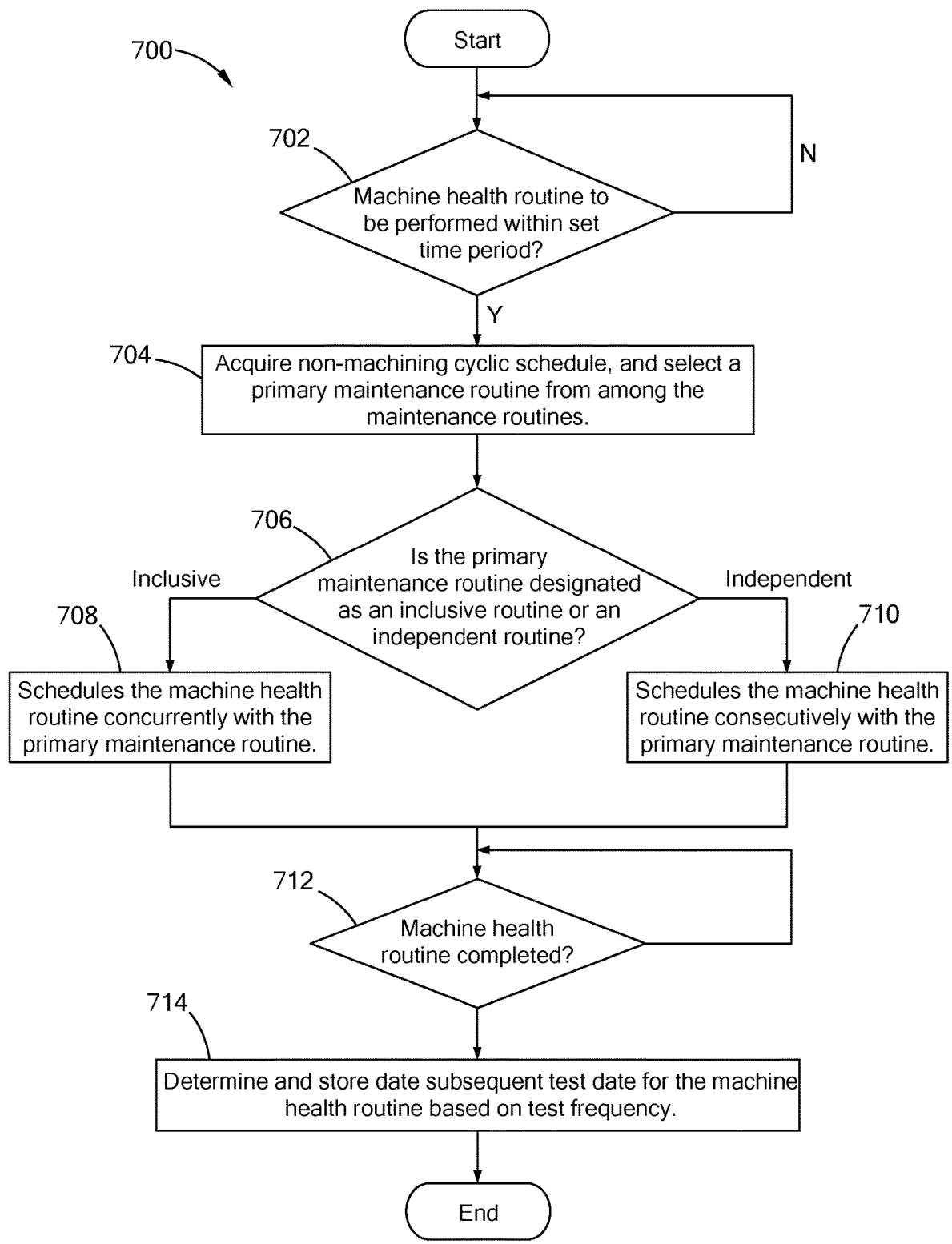

FIG. 4 defines a plurality of maintenance routines in accordance with the teaching of the present disclosure;

FIGS. 5A and 5B illustrate non-machining cyclic schedules in accordance with the teaching of the present disclosure;

FIG. 6 is a flowchart of a test frequency setting routine in accordance with the teaching of the present disclosure; and FIG. 7 is a flowchart of a paring routine in accordance with the teaching of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

To improve operations of a machining tool, data regarding the performance of the machining tool and its components is periodically collected as part of a machine health routine. An example of such a machine health routine is described in U.S. Pat. No. 7,571,022 titled "SYSTEM AND METHOD FOR MONITORING MACHINE HEALTH", which is commonly owned with the present application and the contents of which are incorporated herein by reference in its entirety. For this machine health routine, a component analysis program, such as a spindle analysis or a slide analysis, is performed by the machining tool, and data indicative of a vibrational response of one or more components of the machining tool is collected. Generally, during the component analysis program, a component is controlled to operate at various settings, such as different speeds, acceleration, deceleration, etc. A machine controller outputs data indicative of the movement of the component, such as velocity, acceleration, deceleration, direction of movement, to a controller (e.g., a system operation controller) that also receives vibrational data from the accelerometers. The movement and the vibration data are mapped together to generate a movement-representation profile that is archived and used to monitor the health of the machining tool. In addition to the vibrational response, other data, such as current, power, and/or torque, may also be captured and analyzed as part of the machine health routine.

The machine health routine is performed periodically, and like the maintenance routine, automatically places the machining tool in the non-machining state to conduct the process. To minimize the number of non-machining cycles without comprising the preventive checks being performed, the present disclosure is directed toward a machining tool that is configured to conduct a machine health routine in conjunction with a maintenance routine selected from a plurality of maintenance routines. The machining tool includes a control system that is configured to: determine the frequency at which the machine health routine is to be performed; schedule the health routine with a selected maintenance routine based on a maintenance routine schedule and the next scheduled test date of the health routine; and operate the machining tool to perform the heath routine concurrently with or consecutively with the selected maintenance routine.

Figure 1:
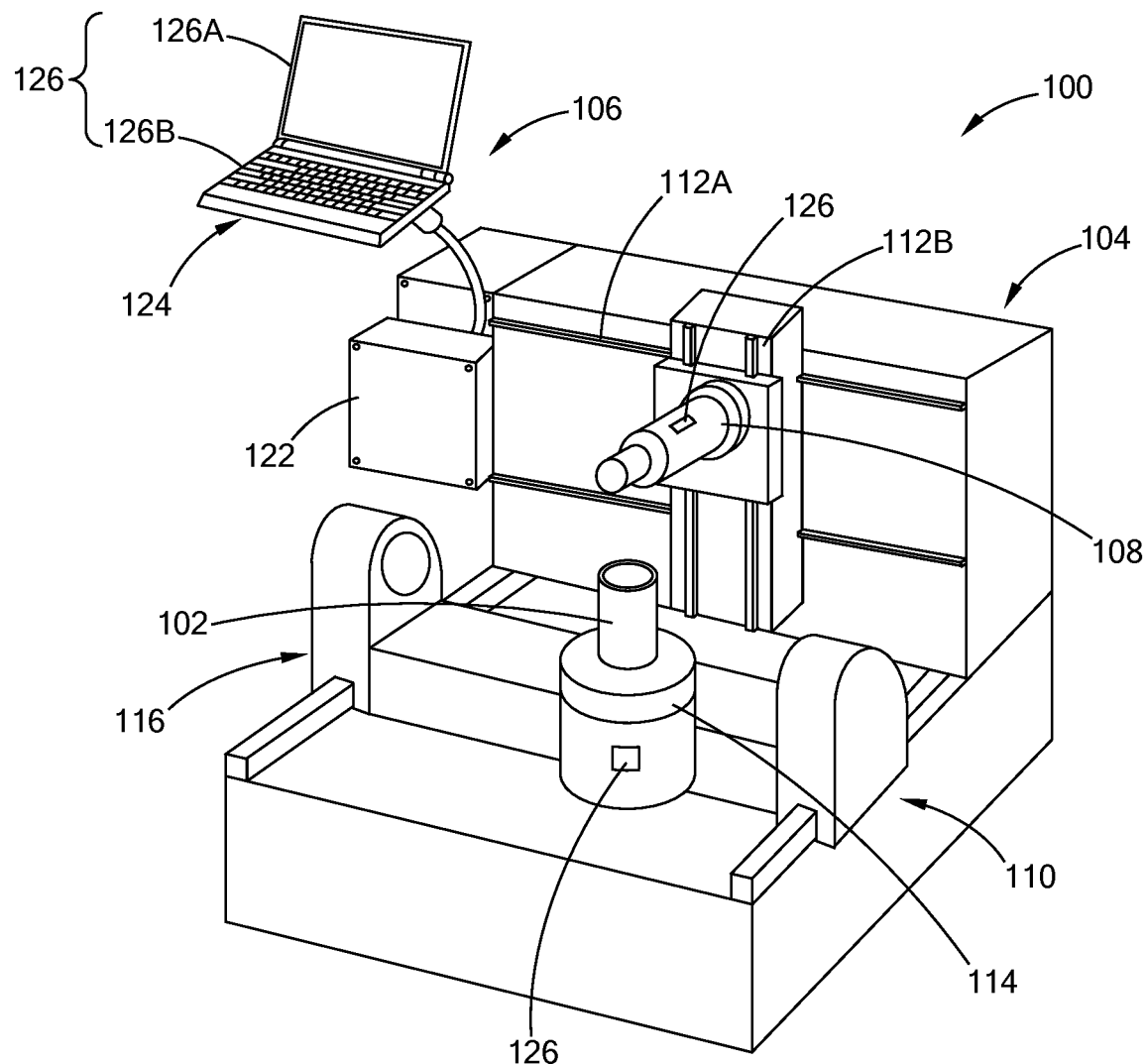
FIG. 1 illustrates a machining tool having a computer numerical control machine and a control system in accordance with the teaching of the present disclosure.

Referring to FIG. 1, a computer numerical control (CNC) machining tool 100 is operable to form parts, such as gear sets, torque converters, etc, from a workpiece 102. In addition to other components, the machining tool 100 includes a multi-axis CNC machine 104 and a control system 106 to control the CNC machine 104. The CNC machine 104 includes a spindle arm (i.e., spindle) 108 and a table 110 for supporting the workpiece 102. The spindle 108 and the table 110 are moveable relative to each other along multiple axes to align the spindle 108 with a portion of the workpiece to be machined. For example, in one form, the spindle 108 is configured to hold and rotate a tool attached to an end of the spindle 108, and is operable to move along multiple axes by way of sliders 112A and 112B. The table 110 is configured to include a rotatable plate 114 and a slider 116 for controlling the position of the workpiece 102. The teachings of the present disclosure are applicable to other machines, and should not be limited to the machining tool 100 depicted.

The control system 106 includes one or more computing devices, to control the CNC machine 104 in a machining state to machine the workpiece 102, and a non-machining state to perform a health check and/or maintenance routine on the machine 104. The control system 106 may be communicably coupled to an external computing device, such as a desktop computer disposed off-site from the machining tool 100 and accessible to a user, to provide information regarding the operation of the machining tool 100 to the user. In one form, the control system 106 includes a machine controller 122 attached to the CNC machine 104, and a system operation controller 124 provided external of the CNC machine 104 and communicably coupled to the machine controller 122 via a wired and/or wireless communication link (e.g., BLUETOOTH, WI-FI, etc).

The machine controller 122 includes a processor and a memory, and is programmed with information specific to the CNC machine 104, and with instructions regarding machining operations and maintenance routines to be performed by the CNC machine 104. The machine controller 122 may be a programmable logic controller (PLC). In one form, the machine controller 122 transmits data related to both machining and non-machining operations performed by the CNC machine 104 to the system operation controller 124. For example, the machine controller 122 outputs data related to the operation of one or more components, such as data indicative of the rotational speed of the spindle 108, acceleration of the spindle 108, and/or movement of one or more sliders. Other outputs include but are not limited to: signals identifying different portion of a machining cycle and of the start or completion of components operation (e.g., start and stop of a spindle); data indicating the type of tool being used and the machining operation being performed with the tool; information providing the state of the machine 104, such as idling state; and/or time related information such as number of machining cycles performed, number of workpieces machined.

The system operation controller 124 may be a computing device having, for example, a processor, a memory, and one or more user interfaces 126 operable by an operator to input commands (e.g., a monitor 126A, and keyboard 126B). While the system operation controller 124 is illustrated as a laptop computer, the controller 124 may be provided as a control panel of the CNC machine 104, a desktop computer, and/or other suitable form. In one form, the system operation controller 124 stores multiple predefined computer programs in a memory and executes the one or more computer programs to have the CNC machine 104 perform the machining and non-machining operations.

To monitor the performance of the machine 104, the machining tool 100 may include one or more sensors 126, such as temperature sensors and/or accelerometers, provided along the machine 104. The sensors 126 are communicably coupled to the system operation controller 124 via wireless and/or a wired communication link to output data of measured parameter (e.g., temperature, acceleration, vibration). Using the data from the machine controller 122 and the sensors 126, the system operation controller 124 is configured to construct time-lapse chart that maps the operation of the machine 104 with the performance data from the sensors 126. This can further be used to detect abnormal activities or track the general health of the machining tool 100.

Figure 2:
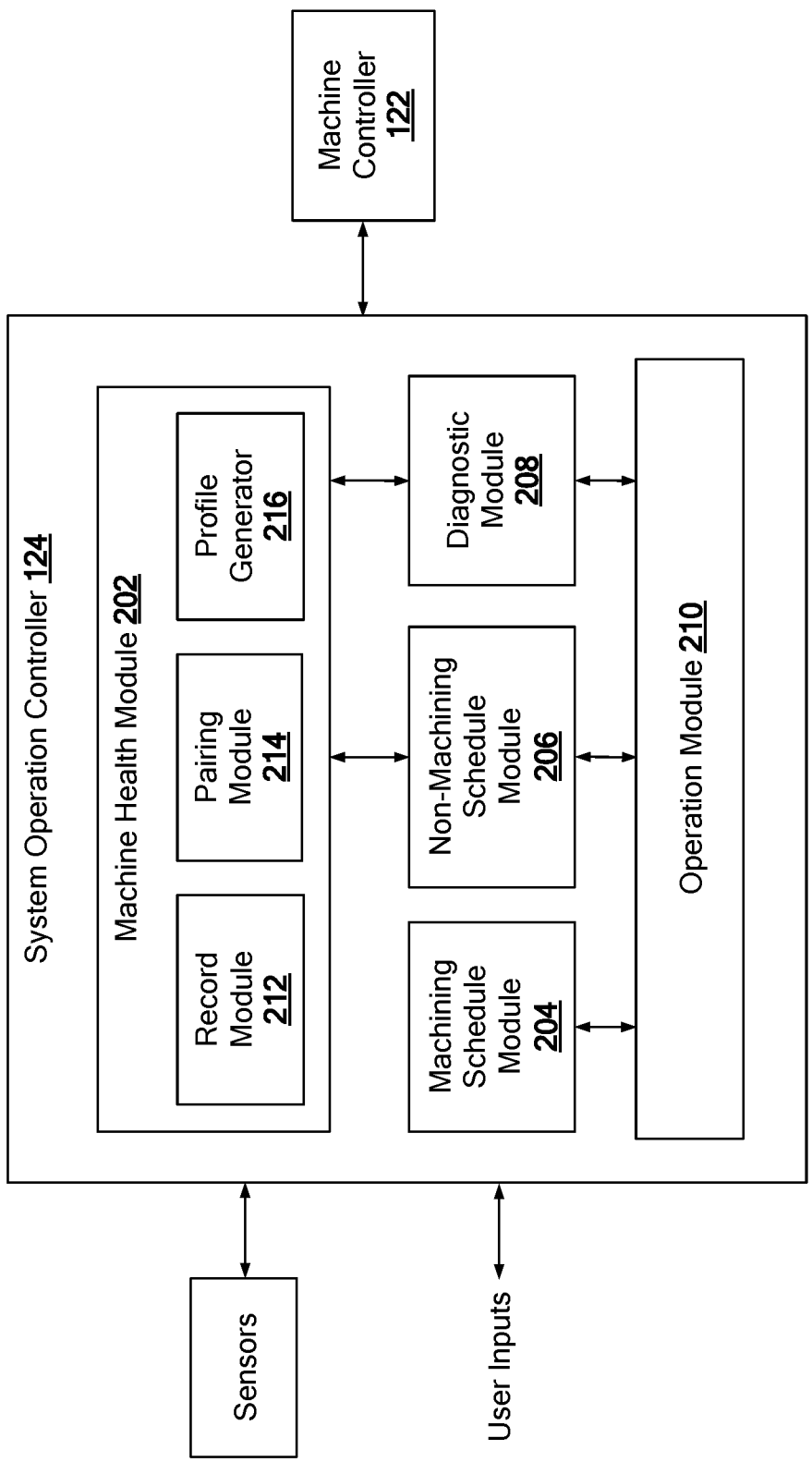
FIG. 2 is a block diagram of the control system in accordance with the teaching of the present disclosure.

Referring to FIG. 2, a block diagram of the control system 106 is illustrated. In one form, the system operation controller 124 is configured to include a machine health module 202, a machining schedule module 204, a non-machining schedule module 206, a diagnostic module 208, and an operation module 210. As described further below, the machine health module 202 is configured to schedule the machine health routine in conjunction with a maintenance routine.

The machining schedule module 204 maintains a machining cyclic schedule that defines a timetable for performing one or more machining operation. Similarly, the non-machining schedule module 206 maintains a non-machining cyclic schedule that defines a timetable for performing one or more cyclic non-machining operations, such as predefined maintenance routines. The machining cyclic schedule and the non-machining cyclic schedule may be adjusted based on, for example, an input from a user or information from other modules.

The diagnostic module 208 is configured to analyze data from the sensors and the machine controller 122 to determine whether the machining tool 100 is operating within one or more predefined parameters. (i.e., whether the machining tool 100 is operating normally or abnormally.) For example, one such diagnostic test may include determining whether a spindle runout condition is present. Other diagnostics may include system checks for determining whether the system is operating normally, and if not, to issue a notification to the operation module 210. Other system checks may detect: presence of a damaged bearings, races, spacers; misalignment condition; unbalance of bearing components or entire spindle system; crash event caused by looseness of the mounting of the spindle; and/or preload issues.

The operation module 210 is configured output a command to the machine controller 122 to control the operation of the CNC machine 104. In one form, using the machining and non-machining cyclic schedules, the operation module 210 determines the operation to be performed by the CNC machine 104. The operation module 210 retrieves the commands associated with the operation from a memory (not shown) that stores the machining and non-machining programs. In addition, if the diagnostic module 208 issues a notification, the operation module 210 is configured to halt the operation taking place and output a notification to the operator via the user interface 126.

Figure 3:
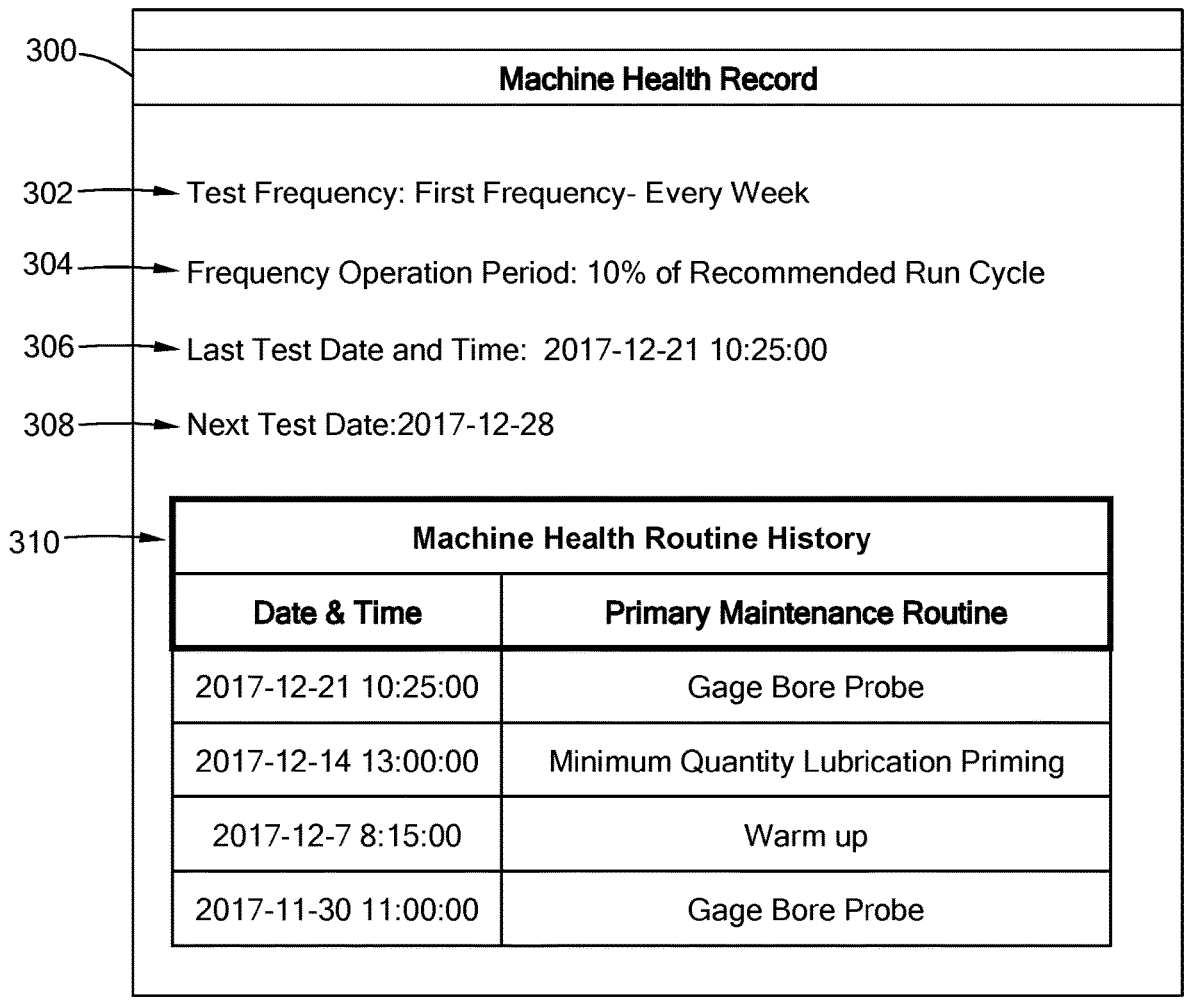
FIG. 3 illustrates a machine health record in accordance with the teaching of the present disclosure.

The machine health schedule 202 includes a record module 212, a pairing module 214, and a profile generator 216. The record module 212 maintains a machine health record that stores information regarding the test plan for conducting the machine health routine. For example, FIG. 3 illustrates a machine health record 300 that defines information regarding a test frequency 302, a frequency time period 304, a previous test date 306, a subsequent test date 308, and a testing history 310.

The test frequency 302 defines the frequency at which the health routine is to be performed, and the frequency time period 304 defines the duration for the set frequency. In one form, the test frequency 302 is selected from two or more frequencies that are selected based on predefined conditions. For example, f after receiving a new component (e.g., spindle, motor, slider, etc), the test frequency is set to a first frequency (e.g., every week), and the time period for the first frequency is defined as a portion of a recommended run cycle of the component (e.g., 10% of 20,000 cycles). In lieu of a cycle based time period, a set time based duration may be used, such as one month, or 2 weeks. After the time period expires, the test frequency is set to a second frequency that is longer in duration than the first frequency (e.g., every month), and remains at this frequency until a predefined condition is met, such an abnormal activity/performance detected by the diagnostic module. If such an abnormality occurs, the test frequency is set to the first frequency until no abnormality is detected for a predefined number of machining cycles (e.g., 50 cycles) or predefined number of health routines that indicate normal operations (e.g. 10 normal health profile) or based on other predefined condition. If such condition is met, the test frequency may reset to the second frequency. But if an error occurs during the machining cycle or an abnormal profile is generated, the test frequency is maintained at the first frequency and/or a notification is transmitted to the operator indicating further maintenance on the machining tool.

While only two frequency levels are provided in the example above, additional frequency levels may be defined. In addition, other conditions may be used to select the test frequency may be used while being within the scope of the present disclosure. For example, the test frequency may be set based on the number of machining cycles performed by the machine 104, such as a first frequency when the cycle is between 1-100, a second frequency when the cycle is between 1000-2000, a third frequency when the cycle is greater than 2000+. At any time there is an abnormal activity, the test frequency reverts to the first frequency and outputs a notification to the operator.

The previous test date 306 identifies that date and time the last health routine was conducted, and the subsequent test date 308 define the next expected date for performing the health routine and is determined based on the test frequency and the previous test date. The testing history 310 documents the date and time the health routine was performed, and the primary maintenance routine used for performing the routine.

The maintenance routines used for the performing the machine health routine are predetermined, and are selected based on one or more factors, such as duration, performance frequency, etc. FIG. 4 illustrates a plurality of maintenance routines that can be used to execute the machine health routine. Each maintenance routine is identified as either being inclusive or independent. If inclusive, the machine health routine is performed concurrently with the maintenance routine, such that movement and the vibration data are gathered during the operation of the maintenance routine and used to to generate a movement-representation profile. If independent, the machine health routine is performed consecutively such that a component analysis program is performed either before or after the maintenance routine to gather movement and vibration data.

With the predetermined maintenance routines, the pairing module 214 selects a primary maintenance routine from among the maintenance routines for performing the machine health routine. This selection may occur a preset time period (e.g., one week, four days) before the subsequent test day or, alternatively, after the performance of the previous machine health routine.

In one form, the pairing module 214 compares the subsequent test date defined in the record module 212 with the non-machining cyclic schedule maintained by the non-machining schedule module 206 to assess which of the predetermined maintenance routines is performed on or in proximity to the subsequent test date. For example, FIGS. 5A and 5B illustrates a non-machining cyclic schedule 500 in which the MR1, gage bore probe, is performed on the same day as the next test date for the machine health routine (i.e. Dec. 28, 2017). Accordingly, the pairing module 214 schedules the machine health routine ("MHR" in figure) with the gage bore probe, as illustrated in revised schedule 500B in FIG. 5B.

In the event more than one maintenance routine is scheduled for the same day as the health routine, the pairing module 214 is configured to select the primary maintenance routine using other factors, such as: the time maintenance routine is being performed, and/or which the maintenance routine have been used in previous machine health assessments. Other factors may be used for selecting a primary maintenance routine. If a maintenance routine is not scheduled for the same day as the next health routine, the pairing module 214 reviews the schedule for the following day or the previous day to determine which maintenance routine is closest in time to the subsequent test date.

The operation module 210 performs the primary maintenance routine and the machine health routine as indicated in the schedule and defined by the type of primary maintenance routine (i.e., inclusive or independent). The profile generator 216 receives the moving data from the machine controller and the vibrational data from the sensors to form the movement-representation profile which is then stored by the system operation controller 124. In one form, the system operation controller 124 is configured to output this profile to an external computing device or database system for storage to conserve memory of the controller 124 and make the profile accessible.

While the system operation controller 124 of the control system 106 is described as performing specific operations for scheduling and executing a machine health routine, the control system 106 may be configured in various suitable ways to perform these operation. For example, a second controller may be used to perform the operation of the machine health module. These and other variations are within the scope of the present disclosure.

Referring to FIG. 6, a test frequency setting routine 700 is provided, and is performed by the control system. At 602, the control system sets the test frequency to a first frequency for a first time period, and at 604 determines whether the first time period is expired. For example, if the first time period is a threshold number of cycles, the control system compares the current cycle number to the threshold number to determine if the first time period is expired. Once the first time period is expired, the control system sets the test frequency to a second frequency that is longer than the first frequency, at 606.

At 608, the control system determines whether an abnormal activity is detected. Once detected, the control system, at 610, sets the test frequency of the machine health routine to the first frequency to have the machine health routine performed at a shorter frequency than that of the second frequency. At 612, the control system determines whether the machining tool is operating at a standard level. If so, the control system returns to 606 to set the test frequency to the second frequency. The standard level can be determined in various suitable ways. For example, if the movement-representation profile from previous machine health routines (e.g., 10 previous routines) are within an operation specification, the machining tool is determined to be operating at a standard level. In another example, if an abnormal activity is not detected for a set time period or a number of cycles, the machining tool is considered operating at a standard level. If the machining tool is not operating at the standard level, the control system determines whether a second level abnormality is detected at 614. If so, the control system generates a maintenance notification and transitions or maintains the machine to the non-machining state, at 616. Otherwise, the test frequency remains at the second frequency. The control routine of FIG. 6, is just one method for setting the test frequency. Other methods may also be used to set the test frequency while remaining within the scope of present disclosure.

Referring to FIG. 7, a pairing routine 700 performed by the control system to schedule the machine health routine with a maintenance routine is provided. At 702, the control system determines whether the machine health routine is to be performed within a set time period, such as within the next week. If so, the control system, at 704, acquires the non-machining cyclic schedule and selects a primary maintenance routine from among multiple maintenance routines provided in the schedule, in a similar manner as described above.

At 706, the control system determines whether the primary maintenance routine is an inclusive routine or an independent routine. If inclusive, the control system schedules the machine health routine concurrently with the primary maintenance routine, at 708. If independent, the control system schedules the machine health check consecutively with the primary maintenance routine, at 710. At 712, the control system determines whether the machine health routine is completed. If so, the control system determines the subsequent test date for performing the machine health routine and stores information regarding the completed machine health routine in the machine health record, at 714.

The control system of the present disclosure, improves the effect of non-machining cycle time by performing the machine health routine with a maintenance routine, in lieu of a separate dedicated timeslot. This allows the control system to continue to monitor the health of the machining tool by performing the vibrational analysis of the machine health check within the cyclic schedule of predefined maintenance routines.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method for monitoring health of a machining tool operable in a machining state to form a workpiece and a non-machining state, the method comprising:
   determining, by a control system, whether a machine health routine is to be performed based on a machine health record stored by the control system;
   retrieving, by the control system, a non-machining cyclic schedule, in response to the machine health routine having to be performed, wherein the non-machining cyclic schedule defines a timetable for performing one or more maintenance routines;
   identifying, by the control system, a primary maintenance routine from among the one or more maintenance routines based on the non-machining cyclic schedule;
   determining, by the control system, whether the primary maintenance routine is an inclusive routine or an independent routine; and
   scheduling and performing, by the control system, the machine health routine with the primary maintenance routine, wherein:
   the machine health routine is performed concurrently with the primary maintenance routine in response to the primary maintenance routine being inclusive, and
   the machine health routine is performed consecutively with the primary maintenance routine in response to the primary maintenance routine being independent.

2. The method of claim 1 further comprising performing, by the control system, a predetermined component analysis health routine, as part of the machine health routine to obtain data indicative of a vibration response of the machining tool in response to the primary maintenance routine being independent.

3. The method of claim 1 further comprising:
   acquiring, from a sensor, data indicative of a vibration response of the machining tool as part of the machine health routine as the primary maintenance routine is being performed; and
   analyzing, by the control system, the data acquired to output a health trend of the machining tool as part of the machine health routine.

4. The method of claim 1, wherein the machine health record defines parameters for determining performance of the machine health routine and includes data indicative of an operation history of the maintenance health routine.

5. The method of claim 4, further comprising:
   determining and storing, by the control system, a subsequent test time for performing the maintenance health routine based on the parameters and the operation history defined by the machine health record, wherein:
   the determining whether the machine health routine is to be performed further comprises:
   comparing the subsequent test time provided in the machine health record with an internal clock of the control system, and
   determining the machine health record is to be performed in response to the subsequent test time being within a predefined time period.

6. The method of claim 5, wherein the primary maintenance routine is performed at a specific timeslot defined by the non-machining cyclic schedule and is proximal to the subsequent test time of the machine health routine.

7. The method of claim 4, wherein the parameters include at least one of a test frequency of the machine health routine, and an operation period of the test frequency.

8. The method of claim 1 further comprising:
placing, by the control system, the machining tool in the non-machining state from the machining state when the primary maintenance routine is to be performed;
performing, by the control system, the primary maintenance routine and the machine health routine; and
storing, by the control system, data indicative of a date and time that the maintenance health routine was performed as part of the machine health record.

9. The method of claim 1 further comprising:
setting a test frequency for the machine health routine to a first frequency for a first operation period;
setting the test frequency for the machine health routine to a second frequency having a greater duration than that of the first frequency in response to the lapse of the first operation period; and
setting the test frequency for the machine health routine to the first frequency in response to the machining tool experiencing an abnormal operation.

10. The method of claim 9, wherein the first operation period is based on a cycle run life of a component of the machining tool.

11. The method of claim 9, wherein the first operation period is a predefined time period.

12. A machining tool comprising:
a machine operable in a machining state to machine a workpiece and in a non-machining state to perform a maintenance routine from among a plurality of maintenance routines; and
a control system configured to control the machine in the machining state and the non-machining state, wherein the control system is configured to execute a machine health routine in conjunction with a primary maintenance routine selected from among the plurality of maintenance routines based on a non-machining cyclic schedule that defines dates and times for performing the maintenance routines and a machine health record that includes information indicative of a subsequent test time for performing the machine health routine, wherein:
the control system is configured to execute the machine health routine concurrently with the primary maintenance routine in response to the primary maintenance routine being defined as an inclusive routine, and
the control system is configured to execute the machine health routine consecutively with the primary maintenance routine in response to the primary maintenance routine being defined as an independent routine.

13. The machining tool of claim 12, wherein:
the control system is configured to set a test frequency for performing the machine health routine, and
the control system sets the test frequency to a first frequency for a first operation period, to a second frequency longer than that of the first frequency in response to the lapse of the first operation period; and to the first frequency in response to an abnormal operation of the machine.

14. The machining tool of claim 12, wherein the primary maintenance is a maintenance routine that is to be performed at a specific timeslot defined by the non-machining cyclic schedule and is proximal to the subsequent test time of the machine health routine.

15. A machining tool control method comprising:
determining a performance time for executing a vibration analysis on a machining tool based on a test frequency for the analysis;
retrieving a non-machining schedule that defines a timetable for executing multiple maintenance routines on the machining tool;
selecting, from among the maintenance routines, a primary routine that is performed at a time period proximal to the performance time;
transferring the machining tool to a non-machining state from a machining state when the primary routine is to be performed;
performing the vibration analysis with the primary routine; and
storing data indicative of a date and time that the vibration analysis was performed as part of a machine health record, wherein the determining the performance time is based on the date and time a previous vibration analysis was performed and the test frequency.

16. The machining tool control method of claim 15 further comprising:
setting the test frequency of the vibration analysis to a first frequency for a first operation period;
setting the test frequency to a second frequency having a greater duration than that of the first frequency in response to the lapse of the first operation period; and
setting the test frequency to the first frequency in response to the machining tool experiencing an abnormal operation.

17. The machining tool control method of claim 15 further comprising:
determining whether the primary routine is an inclusive routine or an independent routine;
performing the vibration analysis concurrently with the primary routine in response to the primary routine being inclusive; and
performing the vibration analysis consecutively with the primary routine in response to the primary routine being independent.

* * * * *